United States Patent
Bontu et al.

(10) Patent No.: US 9,628,229 B2
(45) Date of Patent: Apr. 18, 2017

(54) INTER-CELL COORDINATION IN CELLULAR DEPLOYMENT

(71) Applicant: Telefonaktiebolaget LM Ericsson (publ), Stockholm (SE)

(72) Inventors: Chandra Sekhar Bontu, Nepean (CA); Prabaharan Kanesalingam, Ottawa (CA); Mercy George, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

(21) Appl. No.: 14/406,089

(22) PCT Filed: Dec. 4, 2014

(86) PCT No.: PCT/IB2014/066609
§ 371 (c)(1),
(2) Date: Dec. 5, 2014

(87) PCT Pub. No.: WO2016/087898
PCT Pub. Date: Jun. 9, 2016

(65) Prior Publication Data
US 2016/0254886 A1    Sep. 1, 2016

(51) Int. Cl.
*H04W 24/08*    (2009.01)
*H04L 5/00*    (2006.01)
(Continued)

(52) U.S. Cl.
CPC ......... *H04L 5/0032* (2013.01); *H04B 17/336* (2015.01); *H04L 1/0026* (2013.01);
(Continued)

(58) Field of Classification Search
None
See application file for complete search history.

(56) References Cited

U.S. PATENT DOCUMENTS 9,277,414 B2    3/2016    Jitsukawa
2012/0069756 A1    3/2012    Ji et al.
(Continued)

FOREIGN PATENT DOCUMENTS

WO    2012083973 A1    6/2012

OTHER PUBLICATIONS

3GPP TS 36.331 V12.1.0—3rd Generation Partnership Project; Technical Specification Group Radio Access Network; Evolved Universal Terrestrial Radio Access (E-UTRA); Radio Resource Control (RRC); Protocol specification (Release 12) dated Mar. 2014 consisting of 356-pages.
(Continued)

*Primary Examiner* — Diane Mizrahi
(74) *Attorney, Agent, or Firm* — Christopher & Weisberg, P.A.

(57) ABSTRACT

A method and system for determining whether to apply an inter-cell coordination procedure for a UE in the presence of inter-cell interference from cells, the cells including a serving cell and a plurality of interfering cells, are disclosed. According to one aspect, a method includes receiving measurements of uplink signal quality of the UE from the cells. The method also includes calculating a combined metric based on the received uplink signal quality measurements. The combined metric is compared to a serving cell threshold to determine whether to implement the inter-cell coordination procedure.

14 Claims, 11 Drawing Sheets

(51) Int. Cl.
   *H04L 1/00* (2006.01)
   *H04B 17/336* (2015.01)
   *H04W 72/08* (2009.01)
   *H04W 36/30* (2009.01)

(52) U.S. Cl.
   CPC .......... *H04L 5/0035* (2013.01); *H04L 5/0073* (2013.01); *H04W 24/08* (2013.01); *H04W 72/082* (2013.01); *H04W 36/30* (2013.01)

(56) References Cited

U.S. PATENT DOCUMENTS

| | | | |
|---|---|---|---|
| 2012/0129536 A1 | 5/2012 | Zou et al. | |
| 2013/0094387 A1* | 4/2013 | Susitaival | H04W 72/085 370/252 |
| 2013/0308473 A1 | 11/2013 | Sun et al. | |
| 2014/0105122 A1 | 4/2014 | Zhang et al. | |
| 2014/0219117 A1 | 8/2014 | Meshkati et al. | |
| 2015/0092768 A1 | 4/2015 | Ng et al. | |
| 2016/0037550 A1* | 2/2016 | Barabell | H04B 17/318 455/450 |
| 2016/0165471 A1* | 6/2016 | Bontu | H04L 1/0026 370/241 |

OTHER PUBLICATIONS

International Search Report and Written Opinion dated Jul. 29, 2015 for International Application Serial No. PCT/IB2014/066609, International Filing Date—Dec. 4, 2014 consisting of 14-pages.

International Search Report and Written Opinion dated Aug. 26, 2015 for International Application Serial No. PCT/IB2014/066610, International Filing Date: Dec. 4, 2014 consisting of 13-pages.

3GPP TSG RAN1 #59 Jeju, South Korea—R1-094848 Source: Motorola, Title: SCF-based Coordinated Beamforming and Performance Gain over Single-Point SU/MU Beamforming, Agenda Item: 7.5.3, Document for: Discussion Nov. 9-13, 2009 consisting of 12-pages.

3GPP TS 36.331 V12.3.0 (Sep. 2014) 3rd Generation Partnership Project; Technical Specification Group Radio Access Network; Evolved Universal Terrestrial Radio Access (E-UTRA); Radio Resource Control (RRC); Protocol specification (Release 12) Sep. 23, 2014 consisting of 378-pages.

3GPP TS 36.214 V12.0.0 (Sep. 2014) 3rd Generation Partnership Project; Technical Specification Group Radio Access Network; Evolved Universal Terrestrial Radio Access (E-UTRA); Physical layer; Measurements (Release 12) Sep. 26, 2014 (14-pages).

First Office Action dated Aug. 8, 2016, issued in U.S. Appl. No. 14/406,089, filed Dec. 5, 2014 (14-pages).

* cited by examiner

INTER-CELL COORDINATION IN CELLULAR DEPLOYMENT

FIELD

This written description relates to wireless communications, and in particular to a method and device in a wireless communication system to determine when to trigger a user equipment (UE) measurement report and to determine when a UE will likely benefit from inter-cell coordination.

BACKGROUND

In a typical wireless cellular network, such as $3^{rd}$ generation partnership project long term evolution (3GPP LTE), when deployed as a single frequency network (SFN), the transmissions from various cells and user equipment (UE) should be properly coordinated to maximize the overall system capacity and coverage. A cell may be defined as a coverage area provided by one or more antennas of a base station. Each base station may provide coverage for a plurality of cells via individual cell-site equipment with a common interface to an evolved packet core (EPC). For example, a base station may have antennas affixed to a tower, each of one or more antennas providing coverage for a different geographic area or cells accessible from the tower. A cell may be a serving cell or a neighboring cell. The serving cell is the cell for which the UE is radio resource controlled (RRC) or currently camped, whereas neighboring cells are nearby cells. Note that some cells may overlap and the signals transmitted in one cell may interfere with signals transmitted in another cell. The interfering cells may belong to the same base station or different base stations. Thus, in cases of cell overlap, UEs may receive signals from a plurality of cells and these signals may interfere, especially if the signals of the different cells are transmitted on the same frequency, which is the case for SFNs.

Inter-cell coordination procedures may be employed to improve signal quality experienced by a UE. Examples of inter-cell coordination procedures include inter-cell interference coordination (ICIC), down link (DL) and up link (UL) coordinated multi-point (CoMP) transmission and communication through dual-connectivity. These procedures have been studied extensively as part of the third generation partnership project (3GPP) long term evolution (LTE) advanced standardization activity. Such procedures shall be referred to herein collectively as inter-cell coordination procedures. It is known that system capacity on the down link (DL) can be improved by these procedures by constraining the inter-cell interference experienced by the UE or by increasing the useful signal content of the signal received by the UE.

For ICIC, the radio resources are coordinated between the neighboring cells such that the inter-cell interference experienced by the mobile station or UE is minimized. The coordination may include reducing the transmit power or muting specified radio resources on an interfering cell. Similarly on the up link (UL), the transmissions from the UEs can be scheduled on specific resources such that the interference at a serving cell can be reduced.

For CoMP, the transmissions from the cells can be coordinated such that the combined signal from these cells provides better signal quality at the UE. Similarly, a UE transmission can be scheduled to be received at multiple network nodes such that the received signals can be combined coherently to improve the received signal quality.

For dual connectivity, where a UE is allowed active association with multiple cells at the same time, the serving cell can dynamically select one of the cells as the serving cell to efficiently offload the data and control signaling. In this case the mobility between the coordinating cells will be very efficient.

In each of these cases, the UEs and cells which may benefit from inter-cell coordination should be identified. UEs which are at the cell edge can typically obtain gains from inter-cell coordination, thus improving cell coverage. UEs near a center of a cell may also obtain gains, thus improving cell capacity. In a cellular deployment, the area over which a UE can be served with acceptable signal quality without triggering a handoff is referred to as the coverage. System capacity is another metric can be used to measure the efficiency of a cellular deployment and is defined as the throughput in bits per second that can be achieved over a carrier. For example, the coverage can be specified by a signal to interference plus noise ratio (SINR), $\Gamma_5$, where $\Gamma_5$ is determined such that 5% of connected UEs experience a received SINR of less than or equal to $\Gamma_5$, whereas system throughput can be specified by a SINR, $\Gamma_{50}$, where $\Gamma_{50}$ is determined such that 50% of connected UEs experience a received signal to noise ratio of less than $\Gamma_{50}$. The identification of UEs that may benefit from inter-cell coordination may be based on measurement reports sent to a base station by a UE. Generation and transmission of a measurement report from a UE may be based on measured signal quality received by the UE from neighboring cells.

Ideally, the number of measurement reports from a UE should be triggered by an event such that bandwidth consumption on the uplink from the UE to a serving cell is minimized. Further, the event that triggers transmission of a measurement report should be such that transmission of the measurement report occurs only if the UE can benefit from an inter-cell coordination technique.

In existing long term evolution (LTE) standards, the user equipment (UE) makes measurements of signal quality of signals received from a plurality of neighboring cells. The measurements are triggered based on network defined events. A list of such events is predefined in the standards, using reference signal received power (RSRP) and reference signal received quality (RSRQ). For example, the following RSRP-based metric can be used to trigger a measurement report:

$$\Gamma = (R_I - R_0) > \eta \qquad (1)$$

where $R_o$ is the RSRP of the serving cell and $R_I$ is the RSRP of the strongest interfering cell, as these two parameters are measured at the UE. The threshold, $\eta$, is set to regulate the number of reports sent by a UE. When the difference between $R_I$ and $R_o$ is below the threshold, $\eta$, the UE reports the RSRP measurements of $R_o$ and an ordered list of RSRPs of a predetermined number of neighbor cells to the serving cell. The number of RSRPs of the neighbor cells is configured by the serving cell. The RSRPs of the neighbor cells are ordered in decreasing order of RSRP. The UE may also report RSRQs of the serving and neighbor cells, as specified in the serving cell's measurement report configuration. For inter-cell coordination, the threshold, $\eta$, may be set to a negative value to ensure that the decision to perform inter-cell coordination does not interfere with a handover decision. Note that the above metric may be modified using RSRQ instead of RSRP. However, the performance results follow the same trend since RSRQ can be interpreted as a scaled version of the RSRP. Herein, RSRP measurements and RSRQ measurements will be referred to as signal quality measurements. As specified in the 3GPP TS 36.331: Radio Resource Control specification, other parameters such as hysteresis, frequency and neighbor cell specific offsets can also be included in the metric computed at the UE.

As depicted in FIG. 1, the inter-cell coordination region 2 may be triggered whenever the RSRP with respect to the neighbor cell is within η deci-Bels (dB) of the RSRP with respect to the serving cell. The margin, η, determines the number of measurement events reported by the UEs to the serving cell. The inter-cell coordination can be extended until the handover is triggered, i.e., inter-cell coordination can be operational when the RSRP of a neighbor cell is within $[R_0-\eta_H, R_0+\eta]$, where $\eta_H$ represents the RSRP threshold for handover. FIG. 2 shows results of gain in geometry that can be obtained at the UE by enabling an inter-cell coordination process, e.g., muting the radio resources from the dominant interfering cells. The term "geometry" is a term of art that relates to long term signal to interference plus noise ratio (SINR) when all cells are transmitting at a constant power level. A gain in geometry is related to a gain in SINR.

The cumulative distribution functions (CDF) shown in FIG. 2 expectedly demonstrate that there is significant gain by muting the dominant interfering cells. Curve number 4 is the CDF when there is no ICIC, solid curves numbered 6 are the CDF for one, two and three interferers using limited feedback, i.e., when the threshold, η, is used to limit measurement reports from the UEs. The dashed curves numbered 8 are the CDF for one, two and three interferers suppressed using 100% feedback, i.e., when the measurements reports are sent periodically from all UEs without restriction. Note that the gains obtained by limited measurement feedback (curves numbered 6) are confined to the lower geometry region. In the simulation results of FIG. 2, η is set to 4 dB, which corresponds to 25-30% UE measurement feedback. Therefore, it is evident that the currently defined triggering event of equation 1, may be ideally suited for handoff decisions—such as identifying UEs experiencing inferior channel conditions—but is less desirable for triggering inter-cell coordination. Thus, events defined by current LTE standards may generate unnecessary measurement reports and/or the reported measurements may not be useful to exploit the full benefits of inter-cell coordination.

SUMMARY

The present invention advantageously provides a method and system for determining whether to apply an inter-cell coordination procedure for a UE in the presence of a serving cell and a plurality of neighboring cells. According to one aspect, a method includes receiving measurements of uplink signal quality of the UE from the cells. The method also includes calculating a combined metric based on the received uplink signal quality measurements. The combined metric is compared to a serving cell threshold to determine whether to implement the inter-cell coordination procedure.

According to this aspect, in some embodiments, receiving the measurements of uplink signal quality of the UE from the cells is performed over an X2 interface connecting base stations. In some embodiments, the method also includes receiving a measurement report from the UE upon occurrence of an event, the measurement report containing received signal qualities of the serving cell and the neighboring cells as measured at the UE. In some embodiments, the event is a signal quality from a dominant neighboring cell compared to a signal quality of the serving cell being greater than a second threshold. In such embodiments the dominant neighbor cell may be one for which a UE received signal quality is highest among all of the plurality of neighboring cells. In some embodiments, the threshold is set to regulate a ratio of a number of UEs in inter-cell coordination a total of UEs which are actively served by the cells of a base station.

In some embodiments, the combined metric is calculated by determining the algebraic sum of the UE signal quality metric scaled by a first scaling parameter and an estimated signal to interference ratio, SIR, scaled by a second scaling parameter. In such embodiments, the UE signal quality metric may be calculated as a received signal quality of a dominant neighboring cell in a logarithmic scale minus a received signal quality of the serving cell in the logarithmic scale. In another embodiment, the UE signal quality metric is calculated as a received signal quality of a transmitted signal from the UE at a dominant neighboring cell in a logarithmic scale minus a received signal quality of a transmitted signal from the UE at the serving cell in logarithmic scale. In some embodiments, the second scaling parameter is set equal to one minus the first scaling parameter. In some embodiments, the SIR is estimated as a difference of an uplink received signal quality of the UE reported by the serving cell in and a combined uplink received signal quality of the UE reported by a plurality of neighboring cells in a neighborhood of the UE. In some embodiments, the combined uplink received signal quality of the UE reported by the interfering cells is computed as a linear sum of all uplink received signal qualities of the UE reported by the neighboring cells. In some embodiments, the scaling parameter is set to achieve one of enablement of coordination gain for improved coverage and increased system capacity. In some embodiments, the serving cell threshold is calculated to determine when execution of the inter-cell coordination procedure will likely improve communications with the UE in comparison with an absence of execution of the inter-cell coordination procedure.

According to another aspect, a base station serves a UE via a serving cell and a plurality of neighboring cells. The base station includes a communication interface, a memory and computational circuitry. The communication interface is configured to receive a UE signal quality measurement report. The memory is configured to store a combined metric computed at the base station, a UE signal quality measurement report from the UE and transmitted to the base station and a serving cell threshold. The computational circuitry is in operative communication with the memory and the communication interface and is configured to: calculate a signal to interference ratio, SIR, experienced by the UE based on received uplink signal quality measurements at the serving cell and the neighboring cells; calculate a UE signal quality metric based on the UWE signal quality measurement report; calculate the combined metric based on the estimated SIR, the UE signal quality metric and a scaling parameter; and compare the combined metric to the serving cell threshold to determine whether to implement an inter-cell coordination procedure.

According to this aspect, in some embodiments, the memory is further configured to store a UE threshold to be sent to the UE to trigger the UE signal quality measurement report. In another embodiment, the UE signal quality measurement report contains received signal qualities of the serving cell and neighboring cells as measured at the UE (16). In some embodiments, the combined metric is calculated by determining an algebraic sum of the scaling parameter times the UE signal quality metric and one minus the scaling parameter times the estimated signal to interference ratio. In still another embodiment, the UE signal quality metric is calculated as a received signal quality of a dominant neighboring cell in a logarithmic scale minus a received signal quality of the serving cell in logarithmic scale. In some embodiments, the combined metric calculated by the computational circuitry is given by:

$$\beta_{dB} = \alpha(R_{\ell_{dB}} - R_{0_{dB}}) + (1-\alpha)\left(S_{0_{dB}} - 10\log_{10}\left(\sum_{i=1}^{N-1} S_i\right)\right)$$

where α is the scaling parameter, $R_{IdB}$ is the signal quality of a dominant interfering cell measured at the UE, $R_{odB}$ is the signal quality of a serving base station measured at the UE, $S_{0dB}$ is the signal quality measured at the serving base station of a UE transmission, and $S_i$ is the signal quality measured at the ith interfering cell of the UE transmission. In some embodiments, the measurement report containing the received signal quality of the serving and neighboring cells measured at the UE is sent when a measure of a signal quality from a dominant interfering cell compared to a signal quality of the serving cell is greater than a UE threshold. In some embodiments, the UE threshold is specified by the serving cell and is calculated to regulate a frequency of measurement reports from the UE. In some embodiments, the serving cell threshold is calculated to determine when execution of an inter-cell coordination procedure will likely improve communications with the UE in comparison with an absence of execution of the inter-cell coordination procedure.

According to yet another embodiment, a base station has a communication interface, a processor and a memory. The communication interface is configured to receive a user equipment, UE, signal quality measurement report. The processor is configured to execute software instructions. The memory is in communication with the processor and is configured to store a combined metric, the UE signal quality measurement report received from the UE by the communication interface and a serving cell threshold. The plurality of software modules include a signal to interference, SIR, estimator module having instructions that, when executed by the processor, cause the processor to estimate a signal to interference ratio, SIR, experienced by a user equipment, UE, based on received uplink signal strength measurements. A metric calculator module has instructions that, when executed by the processor, cause the processor to calculate the combined metric based on the estimated SIR, a UE signal quality metric determined from the UE signal quality measurement report and a scaling parameter. A metric comparator module having instructions that, when executed by the processor, cause the processor to compare the combined metric to the serving cell threshold to determine whether to implement an inter-cell coordination procedure.

According to this aspect, in some embodiments, the processor is further instructed by the instructions of the metric calculator module to calculate the combined metric as the algebraic sum of the scaling parameter times the UE signal quality metric and one minus the scaling parameter times the estimated signal to interference ratio. In other embodiments, the UE signal quality metric is calculated as a received signal quality of a dominant neighboring cell in a logarithmic scale minus a received signal quality of the serving cell in logarithmic scale. In some embodiments, the processor is further instructed by the instructions of the metric comparator module to determine, based on the combined metric, whether to execute the inter-cell coordination procedure. In some embodiments, the memory is further configured to store a UE threshold to be sent to the UE for triggering a measurement report from the UE.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
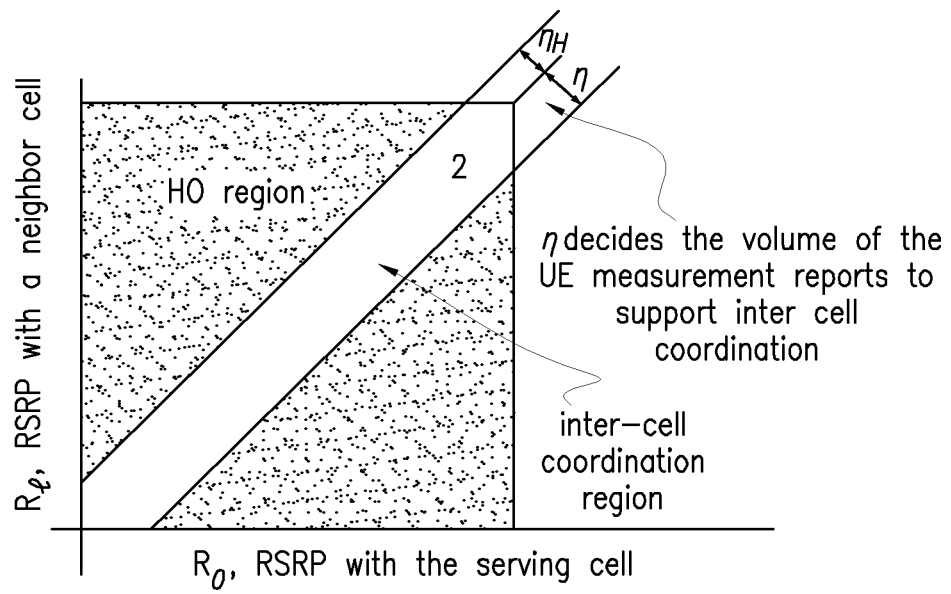
FIG. 1 is a graph of an inter-cell coordination region specified by a threshold.
Figure 2:
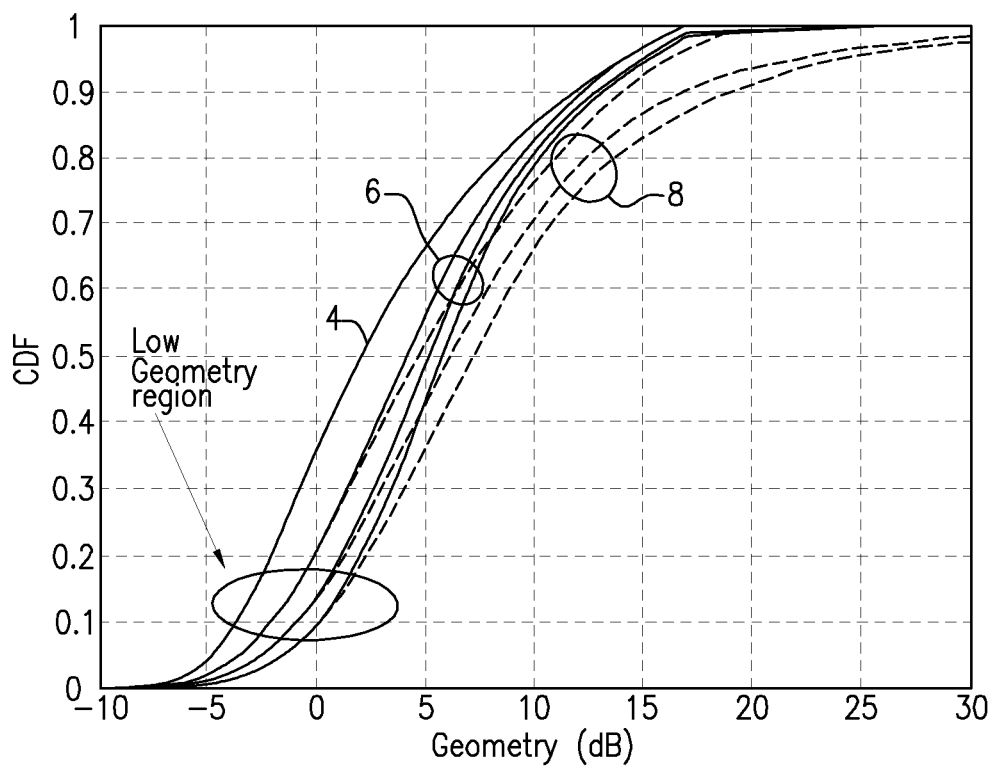
FIG. 2 is a graph of cumulative distribution functions (CDF) showing gains in geometry with the application of inter-cell coordination procedures.

Before describing in detail exemplary embodiments that are in accordance with the present disclosure, it is noted that the embodiments reside primarily in combinations of apparatus components and processing steps related to determining when to trigger a UE measurement report so that the UE will benefit from inter-cell coordination and determining when inter-cell coordination would likely result in improved performance. Accordingly, the device, system and method components have been represented where appropriate by conventional symbols in the drawings, showing those specific details that are pertinent to understanding the embodiments of the present disclosure.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein provide a mechanism for determining when to trigger a UE measurement so that a number of measurement reports transmitted from the UE are limited and so that a measurement report is sent by the UE, ideally, only when the UE will likely benefit from an inter-cell coordination technique. To achieve these features, a serving cell may send a scaling parameter and a UE threshold to one or more UEs. The scaling parameter and UE threshold can be broadcast to all UEs within a coverage area or by transmitting a UE-specific radio resource control (RRC) message directly to one or more UEs. If the UE-specific RRC message is used, the scaling parameter and threshold can be specific to the UE.

Upon receiving the scaling parameter and UE threshold from the serving cell, a UE may start checking the metric for a specified event from the measured received signal quality—for example, RSRP or RSRQ—from the serving cell and interfering neighbor cells. A UE metric described below is computed by the UE based on the scaling parameter and measured signal qualities. This UE metric is compared to the UE threshold. When the UE metric becomes greater than the UE threshold, the UE measurements of the signal qualities are transmitted from the UE to the serving cell. By choosing the UE metric as described below, the number of measurement reports sent by the UE is limited, to conserve bandwidth, and are sent ideally, only when it is likely that the UE will benefit from inter-cell coordination, to conserve processing resources and bandwidth.

Note that the new metric computed by the UE in some embodiments described herein is different from the known metric given above in equation 1, because the new metric is based on the received signal qualities of multiple interfering neighbor cells and the scaling parameter, whereas the known metric is based only on the signal quality of the serving cell and a single dominant interferer.

In some embodiments, a known metric may be used at the UE to determine whether to send a measurement report but a new metric is computed at the serving cell to determine whether an inter-cell coordination procedure would be beneficial. This metric may be based on an estimated signal to interference plus noise ratio (SINR). The combination of the metric computed at the UE and the metric computed at the base station is compared to a serving cell threshold to determine whether to proceed with the inter-cell coordination procedure. An advantage of this embodiment is that no modifications to the standard specifications to the UE are required, and yet the serving cell is able to distinguish when inter-cell coordination would be beneficial.

In this written description, the metric computed at the UE will be referred to as the UE metric and a metric computed at the base station will be referred to as the serving cell metric. A combination metric may also be computed at the base station that is the combination of the UE metric and the serving cell metric. Also, the threshold to which the UE metric is compared at the UE is referred to as the UE threshold. The threshold to which the combined metric is compared is referred to as the serving cell threshold.

Figure 3:
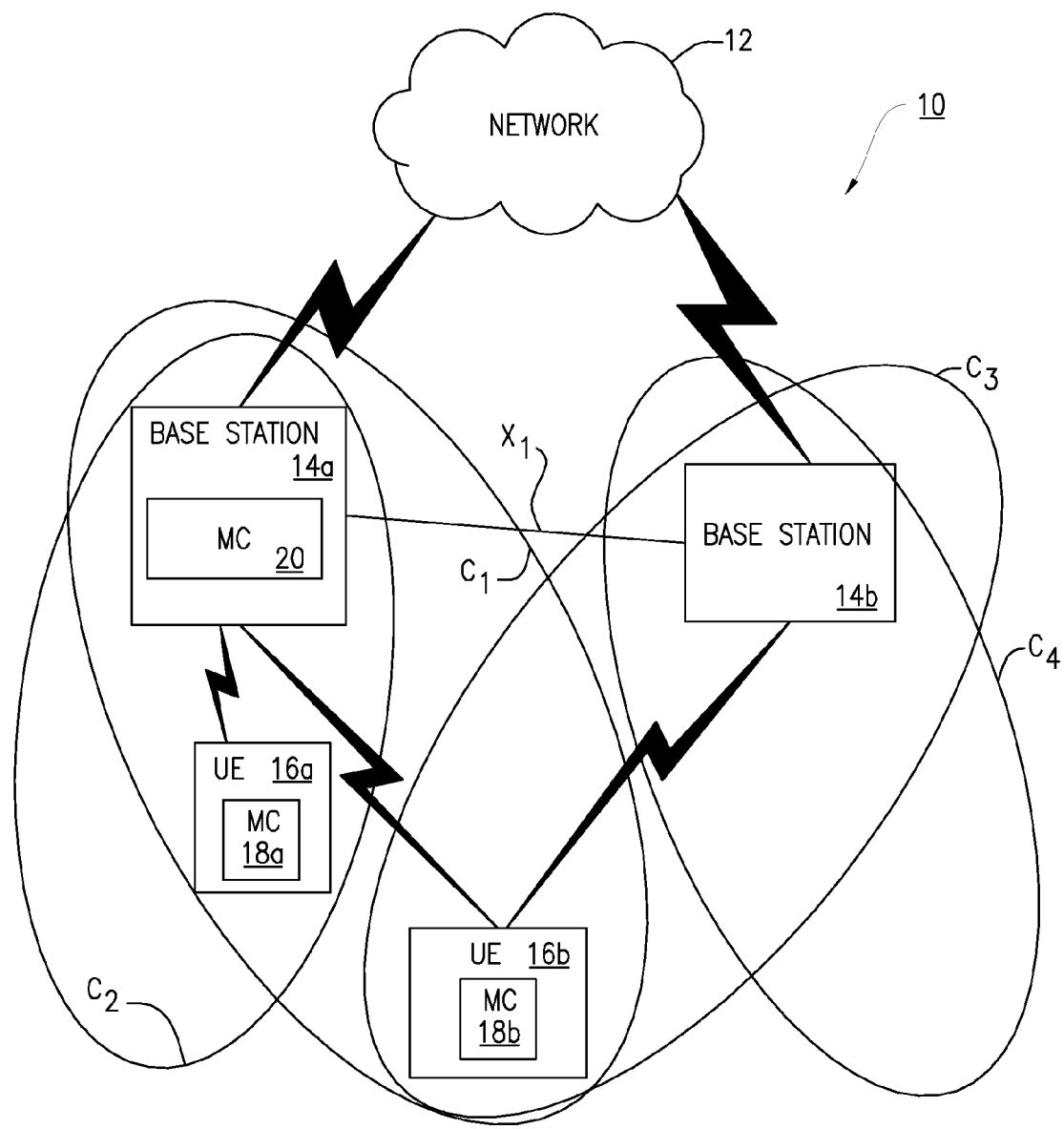
FIG. 3 is a block diagram of a wireless communication system configured to compute metrics according to principles of embodiments described herein.

Returning now to the drawing figures, where like reference designators refer to like elements, there is shown in FIG. 3 a wireless communication system 10 that includes a network 12, which may include a backhaul network that includes third generation partnership project (3GPP) defined packet core (PC) or evolved packet core (EPC) network, the Internet and/or the public switched telephone network (PSTN). The system 10 includes a plurality of base stations 14a and 14b, referred to herein collectively as base stations 14, that are in communication with the network 12 via a wireline or wireless interface, and are in communication with a plurality of UEs such as UEs 16a and 16b, referred to herein collectively as UEs 16. Although only two base stations 14 and two UEs 16 are shown for ease of explanation, a typical wireless communication system 10 will have many more than two base stations and many more than two UEs. The UEs 16 may typically include mobile stations such as mobile phones. The base stations 14 are typically stationary and provide the communications links between the network 12 and the UEs 16. Each base station 14 may serve one or more cells. For example, the base station 14a serves cells C1 and C2, whereas the base station 14b serves cells C3 and C4. Although only two cells per base station are shown for clarity, each base station may serve any number of cells. Note that there is some overlap between cells C1 and C2, served by the same base station 14a. There is also some overlap between cells C1 and C3 served by base station 14a and 14b, respectively.

To mitigate interference, inter-cell coordination procedures, such as ICIC, CoMP and/or dual connectivity, may be employed to improve the signal quality experienced by the UE. In some embodiments, a measurement report and whether to send the measurement report from a UE such as UE 16a to a serving cell of a base station 14a may be determined at the UE 16 based on a UE metric computed by a UE metric calculator (MC). Accordingly, each UE 16a and 16b has a UE metric calculator 18a and 18b, respectively, referred to herein collectively as UE metric calculators 18. The UE metric calculator 18 may be implemented by dedicated computational circuitry or by a processor operating under the direction of programmatic software. In this written description, cell C1 shall be considered a serving cell of UEs 16a and 16b, and cells C2-C4 shall be considered non-serving, neighboring or interfering cells.

The base station 14a, which serves serving cell C1, may include a serving cell metric calculator 20, which may be implemented by dedicated computational circuitry or by a processor operating under the directions of one or more software modules. In some embodiments, the serving cell metric calculator 20 calculates a serving cell metric that is used to determine, based on the measurement report sent from the UE 16 and based on uplink (UL) signal quality measurement reports received from the benefit the UE 16. Note that the interfering cells may be cells served by the same base station or by base stations connected by an X2 interface or proprietary interface.

In some embodiments, a measurement report and whether to send the measurement report from a UE such as UE 16a to a serving cell of base station 14a may be determined at the UE 16 based on a UE metric computed by a UE metric calculator (MC). Further, the metric calculator 20 calculates a metric that is used to determine, based on the measurement report sent from the UE 16 and up link (UL) signal quality measurement reports received from the neighbor or interfering cells, whether an inter-cell coordination procedure will likely benefit the UE 16. In this case, the metric calculated at MC 20 may determine whether or not the inter-cell coordination is enabled by considering both the downlink (DL) and UL measurement reports.

The UE metric computed by the UE metric calculator 18 and used by the UE 16 to determine whether to send a measurement report to the serving cell C1 of the base station 14a, is based on a scaling parameter sent via the serving cell C1, and is further based on received signal quality measurements of a plurality of interfering cells C2, C3 and C4.

In cases using known or existing events, as specified by existing standards, to trigger measurement reporting, a check on the gain that can be achieved by inter-cell coordination cannot be determined until after the UE has reported its signal quality measurements to the serving cell. This may result in many UE reports being made that will not lead to an increase in coordination gain for a particular reporting UE, thereby wasting bandwidth and processing resources. What is described herein is a metric calculable at the UE 16 that will determine not only when to send a measurement report but will also be indicative of whether an inter-cell coordination procedure would likely improve communication with the UE 16.

The DL geometry can be expressed using the measured signal qualities of one or more interfering cells, e.g., the cells C2-C4. Note that the term "signal quality" may refer to one or the other of RSRP and RSRQ. Though this written description describes existing measurement metrics such as, RSRP, RSRQ or CQI reports, in general, any quantity which can represent the received signal quality may be used In terms of RSRP, the DL geometry may be expressed as follows:

$$\gamma_0 = \frac{R_0}{\sum_{i=1}^{N-1} R_i + N_0} \quad (2)$$

where $R_o$ is the RSRP of the serving cell e.g., cell C1 measured at the UE and $R_i$ is the RSRP of the $i^{th}$ interfering cell measured at the UE. $N_o$ is noise. Letting $R_\ell$ be the RSRP of the dominant interfering cell (the neighbor cell having the highest measured RSRP of all the neighbor cells), and suppressing the RSRP of the dominant interfering cell, the DL geometry can be expressed as:

$$\gamma_\ell = \frac{R_0}{\sum_{i=1}^{N-1} R_i + N_0 - R_\ell} \quad (3)$$

The gain in DL geometry achieved by suppressing the dominant interfering cell's signal can be expressed in decibels (dB) as:

$$\gamma_{\ell\_dB} = \gamma_{0\_dB} + 10 \log_{10} \frac{\sum_{i=1}^{N-1} R_i + N_0}{\sum_{\substack{i=1 \\ i \neq \ell}}^{N-1} R_i + N_0} \quad (4)$$

Clearly, the DL geometry gain achieved by suppressing the RSRP of the dominant interfering cell is dependent not only on the RSRP of the dominant interfering cell, but is also dependent upon the RSRPs of all other interfering cells. Thus, the expected gain is dependent on the number of interfering cells as well as their relative signal strengths.

Equation 4 can be expressed as follows:

$$\gamma_{\ell\_dB} = \gamma_{0\_dB} - 10 \log_{10}(1+\beta) \quad (5)$$

where $$\beta = \frac{R_\ell}{\sum_{i=1}^{N-1} R_i + N_0} \quad (6)$$

and where β is between 0 and 1 inclusive. As evident from this formulation, the gain in geometry by muting the dominant interfering cell is $$\Delta = \frac{1}{1-\beta}.$$

The gain increases as β approaches 1. For example, if there is only one interferer, β becomes $$\frac{R_\ell}{R_\ell + N_0}.$$

The asymptotic geometry gain in the case of one interferer is $$\left(1 + \frac{R_\ell}{N_0}\right).$$

The term β, in dB, can be expressed as:

$$\beta_{dB} = (R_{\ell_{dB}} - R_{0_{dB}}) + \gamma_{0_{dB}} \quad (7)$$

From the above equation it can be seen that the difference between the signal quality of the dominant interfering cell and the signal quality of the serving cell should be as close as possible to the geometry $\gamma_{O\_dB}$ to obtain the best inter-cell coordination gain. The closeness of the term $(R_{\ell_{dB}} - R_{0_{dB}})$ to the term $\gamma_{0\_dB}$ provides a measure of the effectiveness of a given inter-cell coordination procedure upon system capacity and coverage.

In known implementations, the term $(R_{\ell_{dB}} - R_{0_{dB}})$ is compared with a fixed threshold. This is referred to in the LTE standards as an RSRP-based A3 event. In these known implementations, the inter-cell coordination gain is limited to an average SINR or geometry specified by the A3 threshold. For example, if the A3 threshold is −3 dB, the inter-cell coordination gain is limited to the UEs which experience a geometry of −3 dB or less.

Figure 4:
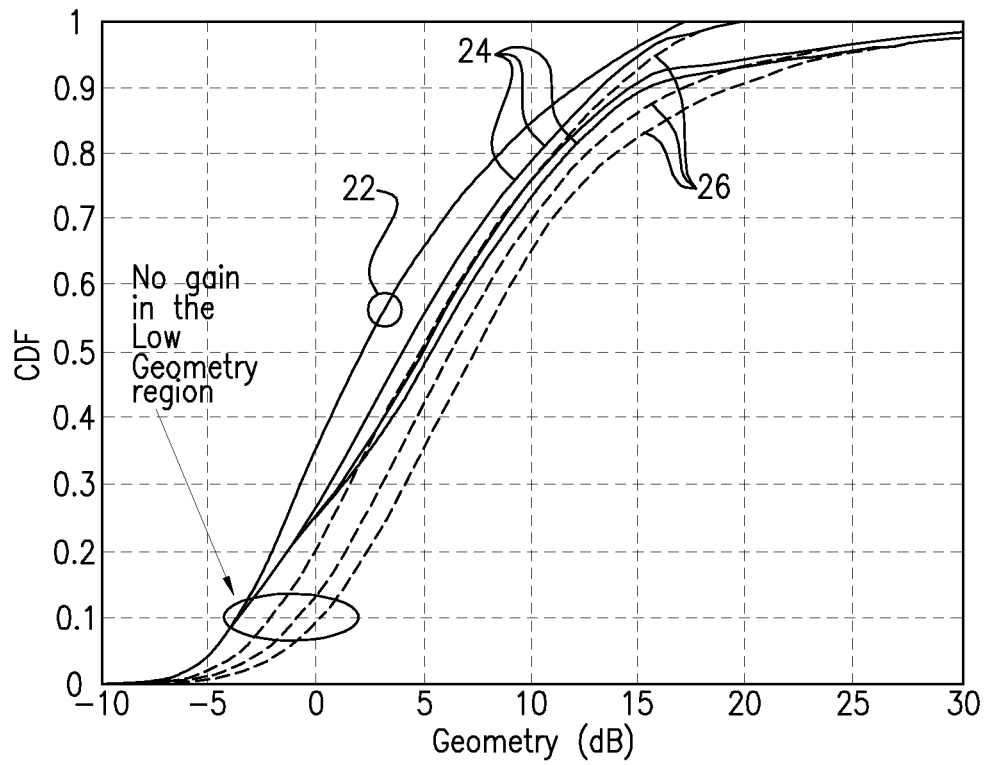
FIG. 4 is a graph of CDF showing gains in geometry with the application of inter-cell coordination procedures using metrics according to principles of embodiments described herein.

Thus, in some embodiments, a new UE metric is computed as:

$$\beta_{dB} = (R_{\ell_{dB}} - R_{0_{dB}}) + \gamma_{0\_dB} < \eta_{dB} \quad (8)$$

where $\eta_{dB}$ is a UE threshold. In the above equation, $R_\ell$ can be the RSRP from one interfering cell or multiple interfering cells. In some embodiments, the serving cell may specify the number of interfering cells to be considered by the UE. The number of interfering cells to be considered may be sent by a broadcast message or an RRC message. This UE metric may be calculated by the UE metric calculator 18 of the UE 16. FIG. 4 is a graph of CDFs showing gains in geometry with the application of inter-cell coordination procedures using metrics according to some embodiments described herein. FIG. 4 shows CDFs for no interference coordination, (curve 22), coordination gain with limited feedback using the metric of equation 8 for one, two and three suppressed interferers, (solid line curves 24), and coordination gain with 100% feedback for one, two and three suppressed interferers, (dashed line curves 26). Note that the gain increases as the number of interferers that are suppressed increases. In simulations depicted by FIG. 4, the threshold $\eta_{dB}$ is set to −4 dB to limit the measurement reports to about 30%. Clearly, the gain in geometry is high at high SINRs. At low SINRs, the gain in geometry for limited feedback is low due to the non-availability of UE feedback.

The UE can measure the parameter $\beta_{dB}$ and compare it to a network defined UE threshold, $\eta$, and then report the measurement results to the serving cell when $\beta_{dB}$ exceeds the UE threshold $\eta$. This event can be defined as:

$$\beta_{dB} = R_{I\_dB} - 10 \log_{10}(\Sigma_{i=1}^{N-1} R_i + N_0) > \eta \qquad (9)$$

which expresses the UE metric as the signal quality, $R_I$, of the dominant interferer minus the signal qualities of all other interferers. Ignoring the noise term, $N_0$, the term $\beta_{dB}$ can be expressed as:

$$\beta_{dB} \approx R_{I_{dB}} - 10 \log_{10}(\Sigma_{i=1}^{N-1} R_i) \qquad (10)$$

Thus, in some embodiments, the UE 16 may be configured to perform the following steps:
(a) Make signal quality measurements of N interferers;
(b) Calculate the ratio of signal quality of the most dominant interferer or interferers to the total interference power level;
(c) Compare the ratio to a UE threshold; and
(d) Report the measurements to the serving cell if the ratio exceeds the UE threshold.

Note that the UE threshold $\eta$ may always be negative when expressed in dB. The UE threshold can be determined at the base station 14a and transmitted to the UE 16 by broadcast or as an RRC message to the UE 16. The UE threshold may be chosen to regulate a ratio of a number of reporting UEs to a number of served UEs. Also, the number N of interferers whose signal qualities are to be used in calculation of the metric may be specified by the serving cell of the base station 14a. Typically the number of interfering cells, N, to be considered in evaluating the UE metric is dependent on the cell deployment scenario. For example in a dense deployment, i.e., where many cells are deployed in a geographical area, a large number of interfering cells may be considered to evaluate the UE metric.

As an alternative to equations 8, 9 and 10, the metric $\beta$ can also be computed using the received signal strength indicator (RSSI) as follows:

$$\beta = \frac{R_\ell}{RSSI - R_0} \qquad (11)$$

The RSSI is measured by the UE and is an indicator of the power present in the received signals.

A composite UE metric can be used for achieving a tradeoff between system coverage and system capacity. This composite metric may be expressed as follows:

$$\beta_{dB} = \alpha(R_{I_{dB}} - R_{0_{dB}}) + (1-\alpha)(R_{0_{dB}} - 10 \log_{10}(\Sigma_{i=1}^{N-1} R_i)) \qquad (12)$$

In equation 12, $\alpha$ is a scaling parameter sent from the serving cell of the base station 14a to the UE 16. The scaling parameter may be assigned a value between 0.5 and 1.0. The value of 0.5 provides better system capacity, whereas the value of 1.0 provides better system coverage. The event defined by $\beta$ exceeding a UE threshold may be used to trigger the UE 16 to send a measurement report. Alternatively, or in addition, $\beta$ may be computed at the serving cell of the base station 14a to determine a candidate interfering cell. For example, the serving cell may compute the metric of equation 12 from the reported measurements from the UE to determine a candidate interfering cell or cells which can coordinate with the serving cell to offer better signal quality at the UE.

Note that the composite metric of equation 12 can be used in the case of joint transmission, i.e., CoMP. Thus, when the same information is transmitted from the serving call and the coordinating cell, the expected gain in geometry can be expressed as follows:

$$\gamma_\ell = \frac{R_0 + R_\ell}{\sum_{i=1}^{N-1} R_i + N_0 - R_\ell} \qquad (13)$$

which can be expressed in dB as:

$$\gamma_{\ell\_dB} = \gamma_{0\_dB} + 10 \log_{10}\left(1 + \frac{R_\ell}{R_0}\right) + 10 \log_{10}\left(\frac{1}{1-\beta}\right). \qquad (14)$$

Therefore, the same event as in equation 12 will suffice for determining whether to send a measurement report for joint transmission as well. The second term in equation 14 indicates the additional gain offered by the joint transmission.

Figure 5:
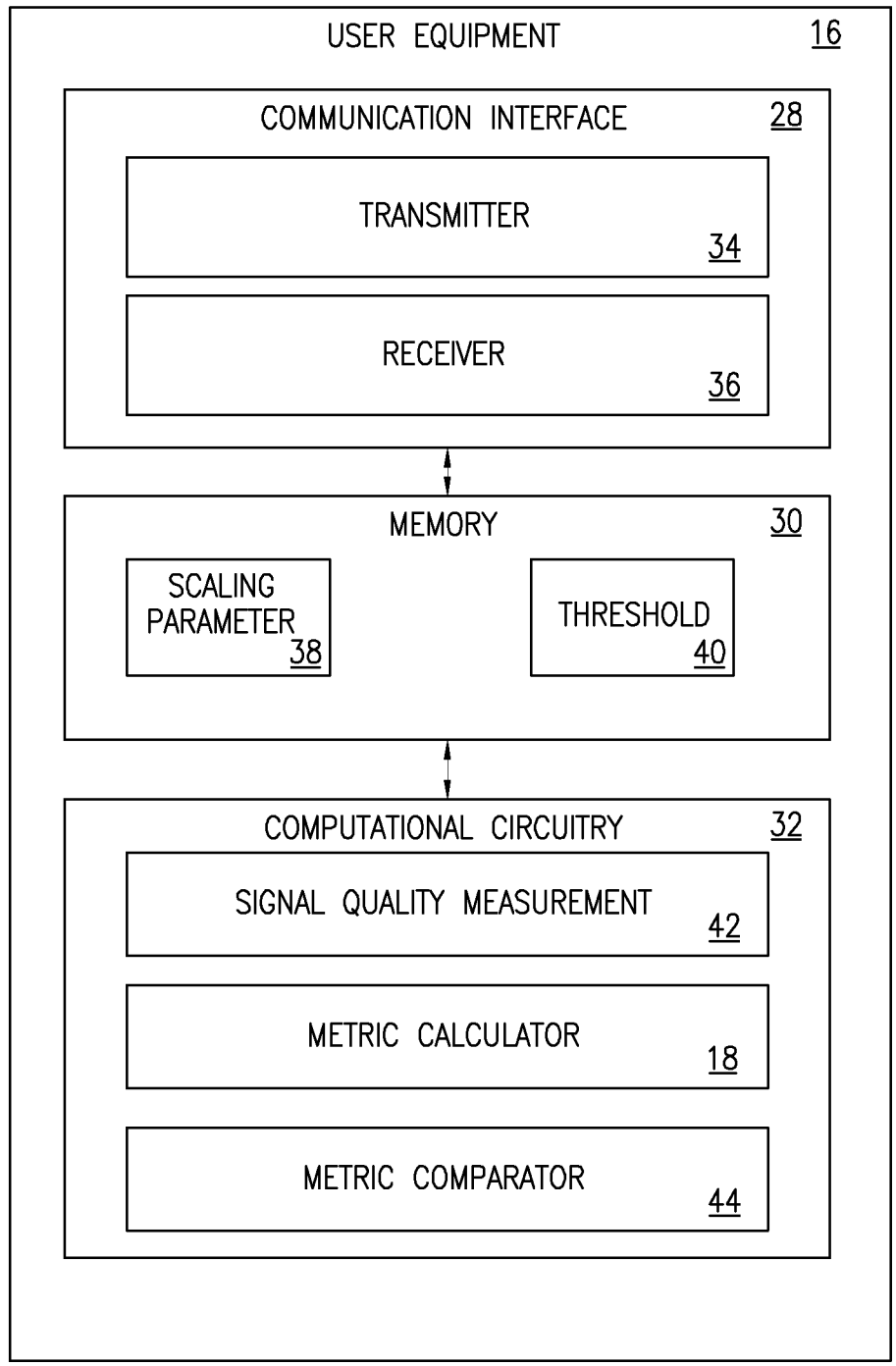
FIG. 5 is a block diagram of one embodiment of a user equipment (UE) configured to compute a UE metric for determining whether to send a measurement report.

Returning now to the drawing figures, there is shown in FIG. 5 a block diagram of one embodiment of a UE 16 configured to calculate a UE metric and determine whether to send a measurement report. The UE 16 includes a communication interface 28, a memory 30 and computational circuitry 32. The communication interface 28 includes a transmitter 34 and a receiver 36. The receiver 36 is configured to receive a scaling parameter and a UE threshold from the serving cell. The receiver 36 is also configured to receive signals from the serving cell and neighboring cells. The transmitter 34 is configured to transmit a measurement report to the serving cell. The memory 30 is configured to store the scaling parameter 38 and the UE threshold 40. The computational circuitry 32 is in communication with the memory 30 and the communication interface 28. The computational circuitry 32 includes signal quality measurement circuitry 42 to perform measurements of received signal quality of the neighboring cells and to determine which one of the neighboring cells is the dominant interfering cell.

The computational circuitry 32 also includes the UE metric calculator 18 which calculates the UE metric $\beta$ according to one of equations 8-12. For example, the UE metric calculator 18 can compute the UE metric of equation 12 based on the signal qualities of the neighboring cells and based on the scaling parameter 38. The UE metric calculator 18 may calculate the UE metric by calculating a first comparison of a signal quality of the serving cell expressed in dBm or dB with the signal quality of the dominant interfering cell expressed in dBm or dB to determine a first difference. The UE metric calculator 18 may also calculate a second comparison of the signal quality of the serving cell in dBm or dB to a linear sum or combination of signal qualities from a plurality of interfering neighboring cells plus thermal noise expressed in dBm or dB, to determine a second difference. The closer the first difference is to the second difference, the more likely the UE 16 will benefit from an inter-cell coordination procedure.

The computational circuitry 32 also includes a metric comparator 44 configured to compare the metric calculated by the UE metric calculator 18 to the UE threshold 40 to determine whether to send a measurement report to the serving cell using the communication interface 28. By only sending the measurement report when the UE metric exceeds the UE threshold, bandwidth is conserved, and inter-cell coordination procedures may be applied only when such procedures are likely to benefit the UE 16, thereby conserving processing power.

Figure 6:
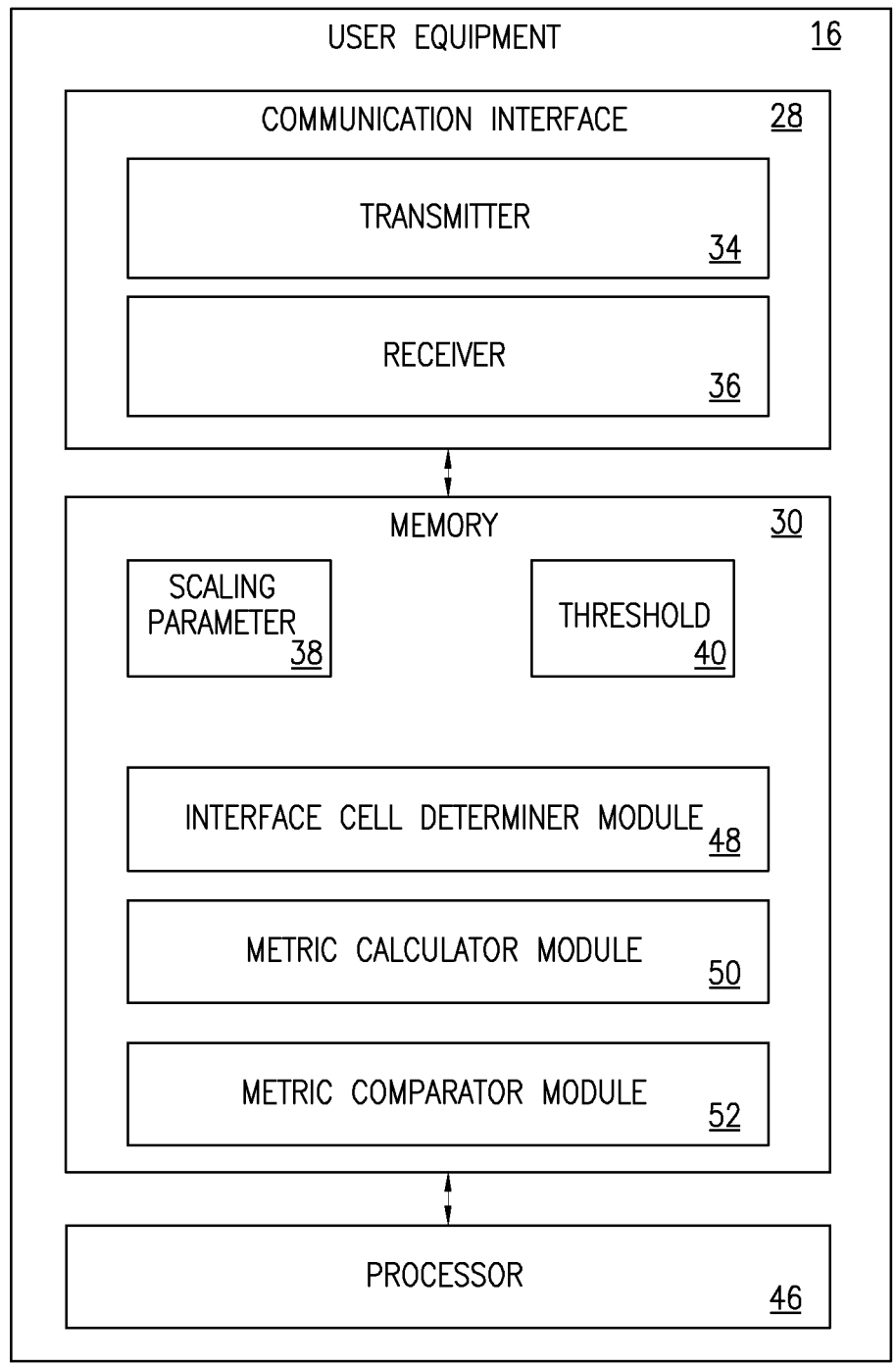
FIG. 6 is a block diagram of another embodiment of a UE configured to compute a UE metric for determining whether to send a measurement report.

FIG. 6 is a block diagram of an embodiment of the UE 16 that uses a processor 46 to execute software instructions of a plurality of software modules stored in the memory 30. The software modules include an interference cell determiner module 48 that includes instructions that, when executed by the processor 46, cause the processor to perform received signal quality measurements of a plurality of neighboring cells and determine cells that are interfering cells based on the performed signal quality measurements.

A UE metric calculator module 50 includes instructions that, when executed by the processor 46, cause the processor to calculate a first value based on a first scaling parameter 38, a signal quality of a serving cell, and a signal quality of a dominant interfering cell. The UE metric calculator module 50 also includes instructions that, when executed by the processor 46, cause the processor to calculate a second value based on a second scaling parameter, the signal quality of the serving cell and a sum of the signal qualities of the interfering cells. The processor 46 is also caused by the instructions of the UE metric calculator module 50 to calculate a sum of the first value and the second value to obtain the UE metric.

The software modules stored in the memory 30 also include a metric comparator module 52 having instructions that, when executed by the processor, cause the processor 46 to compare the UE metric to a UE threshold to determine whether to send a measurement report from the UE. By using software executed by a processor to perform the various functions of the software module instructions, the UE can easily be reprogrammed at a time of manufacture to compute different UE metrics as desired.

Figure 7:
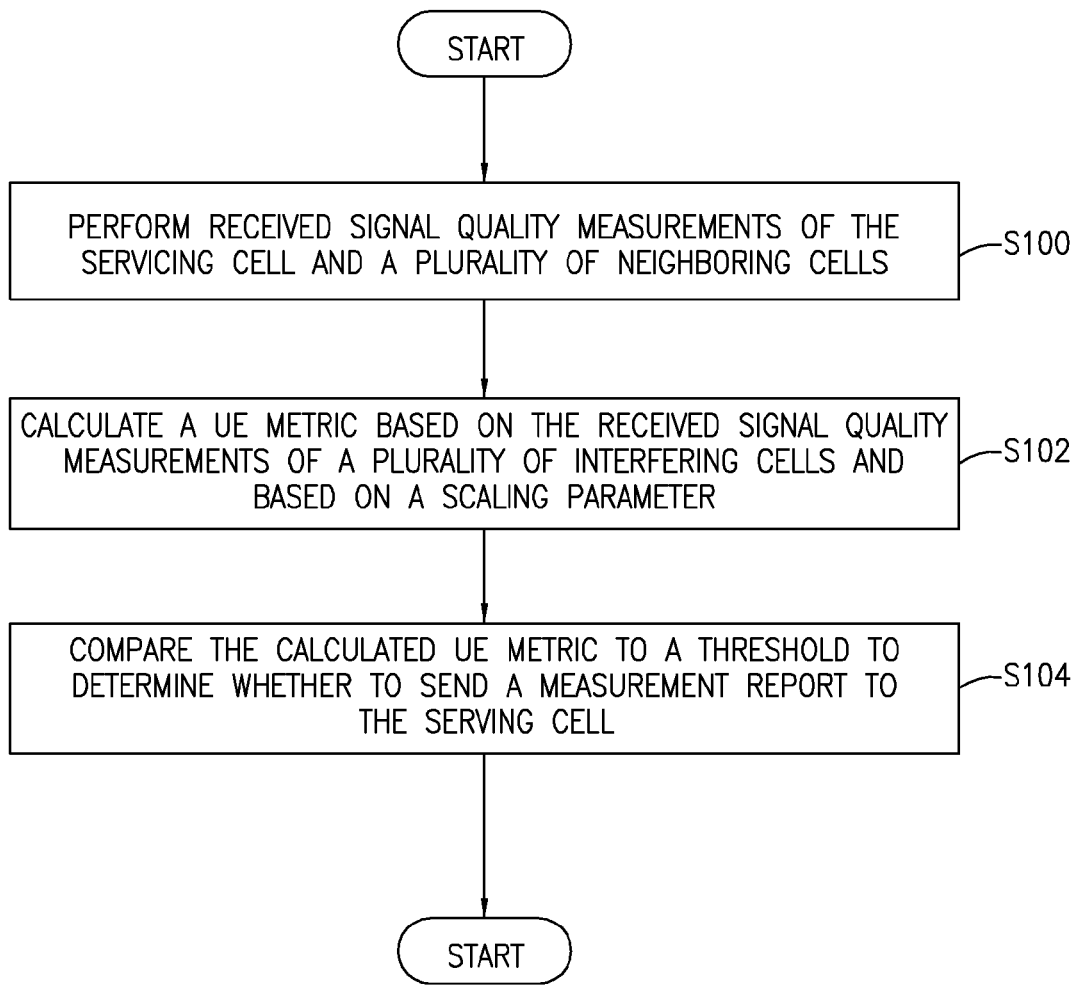
FIG. 7 is a flowchart of an exemplary process for computing a UE metric and determining whether to send a measurement report from a UE to the serving cell of a base station.

FIG. 7 is a flowchart of an exemplary process performed by the UE for computing a UE metric and determining whether to send a measurement report from the UE 16 to the serving cell C1 of the base station 14*a*. Signal quality measurements are performed on the signals received from the serving cell C1 and from a plurality of neighboring cells, e.g., cells C2 and C3 (block S100). A UE metric is calculated based on the received signal quality measurements of a plurality of interfering cells and based on a scaling parameter (block S102). The calculated UE metric is compared to a UE threshold to determine whether to send a measurement report to the serving cell (block S104).

Figure 8:
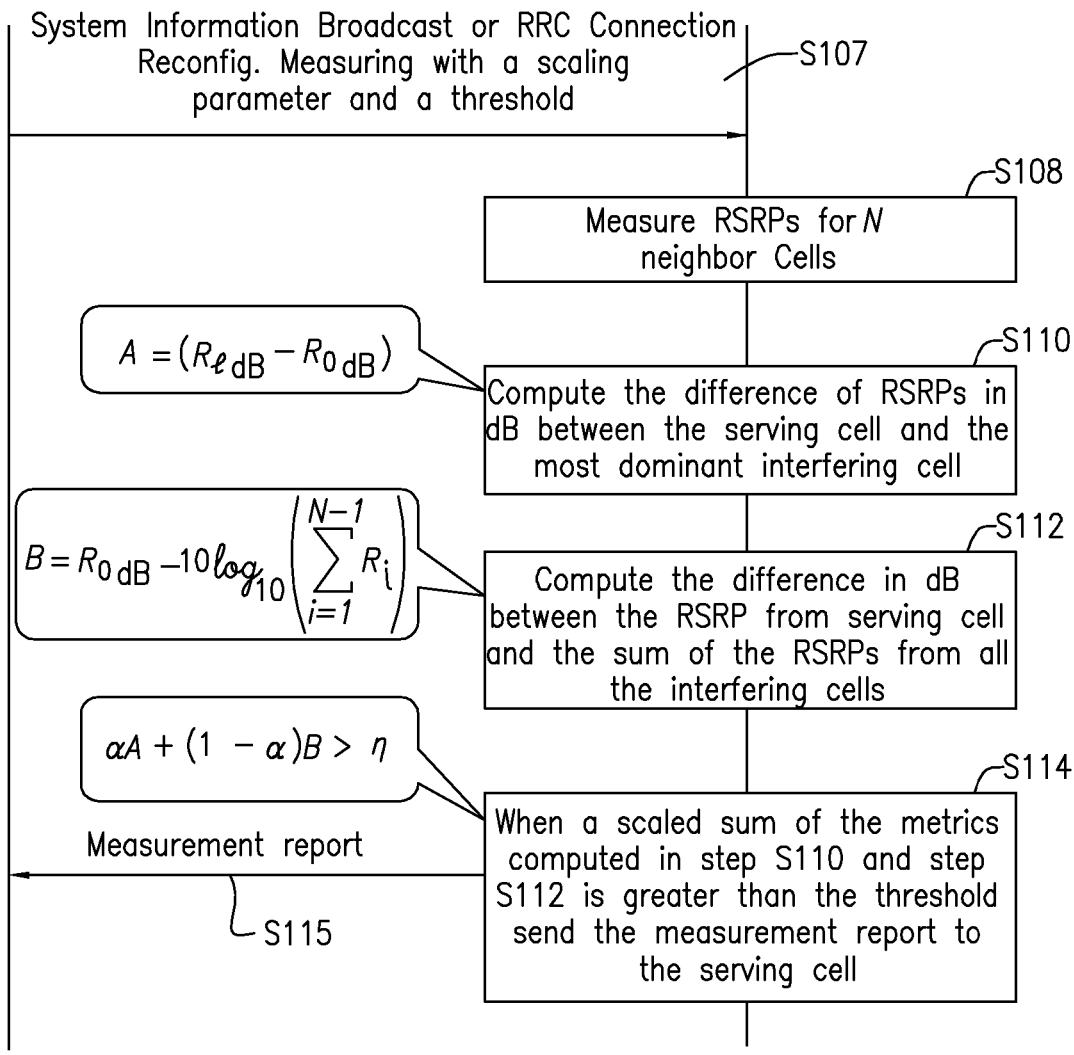
FIG. 8 is a more detailed flow diagram of an exemplary process for computing a UE metric and determining whether to send a measurement report from the UE to the serving cell of the base station.

FIG. 8 is a more detailed flow diagram of an exemplary process for computing a UE metric and determining whether to send a measurement report from the UE 16 to the serving cell of the base station 14*a*. A broadcast signal or an RRC signal is sent to the UE 16 from the base station 14*a* via the serving cell C1 that specifies a scaling parameter and a UE threshold for the defined event (S107). For example, when the network operator wants to enable inter-cell coordination, the serving cell will transmit the broadcast message or the UE-specific RRC message indicating the event identity. The event identity may define the UE metric to measure and the corresponding scaling parameter and UE threshold. In some embodiments, the events and corresponding metrics may be defined by applicable standards. The UE 16 measures signal quality, which may be, in some embodiments, RSRP, for N neighbor cells (S108). The number N of neighbor cells may be specified by the base station 14*a* via the serving cell C1. The UE 16 computes the difference of signal qualities in dB between the serving cell and the most dominant interfering cell (S110) as follows:

$$A = (R_{1_{dB}} - R_{0_{dB}})$$

In some embodiments, the difference between the signal quality of the serving cell expressed in dBm or dB and a linear sum of signal qualities of a number of predefined dominant cells expressed in dBm or dB may be computed. The predefined number may be specified by the serving cell. The dominant interfering cell may be determined by determining the largest signal quality of the neighboring cells. The UE also computes the difference in dB between the signal quality of the serving cell signal and the sum of the signal qualities of the signals from all of the interfering cells (S112) as follows:

$$B = R_{0_{dB}} - 10 \log_{10} \left( \sum_{i=1}^{N-1} R_i \right)$$

The scaled sum of the metrics computed in S110 and S112 is compared to a predetermined threshold as follows:

$$\alpha A + (1-\alpha) B > \eta$$

If the UE metric is greater than the UE threshold (S114), the measurement is sent to the serving cell (S115).

Persons of skill in the art will readily recognize that computing differences of logarithms of two quantities is equivalent to computing the ratio of those two quantities. Thus, in some embodiments, the UE 16 calculates a ratio of the signal quality received from a serving cell to the signal quality received from a dominant interfering cell. Similarly, the UE 16 may calculate a ratio of the received signal quality of the serving cell to the total received signal qualities of all cells in the neighborhood including the serving cell. The UE 16 may then compute a UE metric by scaling and adding the two power ratios.

By comparing the UE metric to a UE threshold to determine whether to send a measurement report, the number of measurement reports sent by the UEs 16 is reduced, thereby conserving bandwidth. Also, when the serving cell receives a measurement report, the serving cell implicitly determines that an inter-cell coordination procedure with respect to the UE 16 sending the report is likely to achieve coordination gain. Conversely, when the UE 16 does not send a report, the inter-cell coordination procedure may not be performed, thereby conserving processing resources and UL radio resources.

Another method for determining when inter-cell coordination would be beneficial may be employed which conforms to the standards and which do not involve defining a new event at the UE 16. The method may be applied when the interfering cells are all served by the same base station 14*a* that serves the serving cell or when the interfering cells are served by a base station 14*b* connected to the base station 14*a* of the serving cell by an X2 interface or proprietary interface. This alternative method may employ a technique to identify cell edge UEs which may benefit by inter-cell coordination using the already-defined A3 event discussed above and by identifying non-cell-edge UEs that can benefit by inter-cell coordination by the serving cell with the help of UL measurements made by neighbor cells. The UL measurements consist of UL signal quality measured over the UL transmissions of the UE. The combined metric can be calculated at the serving cell or base station to determine whether to apply an intra-node inter-cell coordination technique.

Referring to equation 12, the first term on the right of the equal sign is the A3 event scaled by the scaling parameter, $\alpha$. The second term, which serves to determine whether increased capacity can be achieved by inter-cell coordination, can be estimated by the serving cell, when all of the interfering cells to be considered are serviced by the same base station that serves the serving cell. That is, if the inter-cell coordination is restricted to the cells of the common base station of the serving cell, the uplink UL measurements performed at the cells can be used to estimate the second term. For example, the cells of the base station can measure the UL sounding reference signal (SRS) signal quality transmitted by the UEs served by the serving cell and share the measurements with other cells of the base station or with the cells of a base station connected by an X2 or proprietary interface.

To this end, equation 12 can be re-written as follows:

$$\beta_{dB} = \alpha(R_{I_{dB}} - R_{0_{dB}}) + (1-\alpha)(S_{0_{dB}} - 10 \log_{10}(\Sigma_{i=1}^{N-1} S_i)) \qquad (15)$$

where $S_{0_{dB}}$ is the SRS signal quality measured at the serving cell in dB and $S_i$ is the SRS signal quality measured at the $i^{th}$ non-serving cell. In particular, $S_i$ may be the quality of a received SRS signal transmitted by the UE as measured by the $i^{th}$ neighbor cell. The first term on the right may be the A3 metric or another metric scaled by the scaling parameter, $\alpha$, computed by the base station or in some embodiments, calculated at the serving cell based on measurement reports sent to the serving cell by the UE. These measurement reports may include the RSRP of the serving cell and of the dominant interfering cell.

The first term on the right may be computed by the serving cell based on the measurement reports received from the UE as the difference between the signal quality of the serving cell expressed in dBm or dB and a signal quality of a dominant cell expressed in dBm or dB. In some embodiments, the first term on the right may be computed by the serving cell based on the measurement reports received from the UE as the difference between the signal quality of the serving cell expressed in dBm or dB and a linear sum of signal qualities of a number of predefined dominant cells expressed in dBm or dB. The predefined number may be specified by the serving cell.

The second term on the right can be calculated at the base station of the serving cell by summing the SRS signal qualities measured by the cells of the same base station and/or another base station connected by an X2 or proprietary interface. This second term can be interpreted as an estimate of the signal to interference ratio (SIR) expected to be experienced by the UE.

Note that the first term on the right is a UE metric that may be calculated by the UE metric calculator 18 at the UE 16 or may be calculated by the base station, and the second term on the right is a serving cell metric that may be calculated by the serving cell metric calculator 20 at the base station. According to another embodiment, the first term in equation 15 can also be computed based on the uplink measurements as $(S_{I_{dB}} - S_{0_{dB}})$. That is, the first term on the right may be computed by the base station based on the measurement reports received from the serving cell and the neighbor cells as the difference between the received signal quality of a signal transmitted by the UE at the serving cell expressed in dBm or dB and a signal quality of a dominant cell expressed in dBm or dB. In some embodiments, the first term on the right may be computed by the base station based on the measurement reports received from the serving cell and the neighbor cells as the difference between the received signal quality of a transmitted signal from the UE at the serving cell expressed in dBm or dB and a linear sum of received signal qualities of a transmitted signal from the UE at a number of predefined dominant cells expressed in dBm or dB. The predefined number may be specified by the serving cell.

The combination of these two terms is referred to herein as the combined metric. For the neighbor cells to measure the UL received signal quality from UE's SRS transmission, the serving cell should share the UE's SRS configuration with its neighbor cells. Alternative to SRS, physical UL control channel (PUCCH) transmission of the UE may be used. In general any UE specific UL transmission can be used for UL signal quality measurement.

Calculating the combined metric of equation 15 provides an advantage of limiting the number of measurement reports from the UEs by setting the A3 (UE) threshold appropriately. Also, basing a decision whether to perform inter-cell coordination on whether the combined metric of equation 15 exceeds a serving cell threshold should eliminate performing an inter-cell coordination procedure when that performance would not result in significant coordination gain, thereby conserving processing resources.

Figure 9:
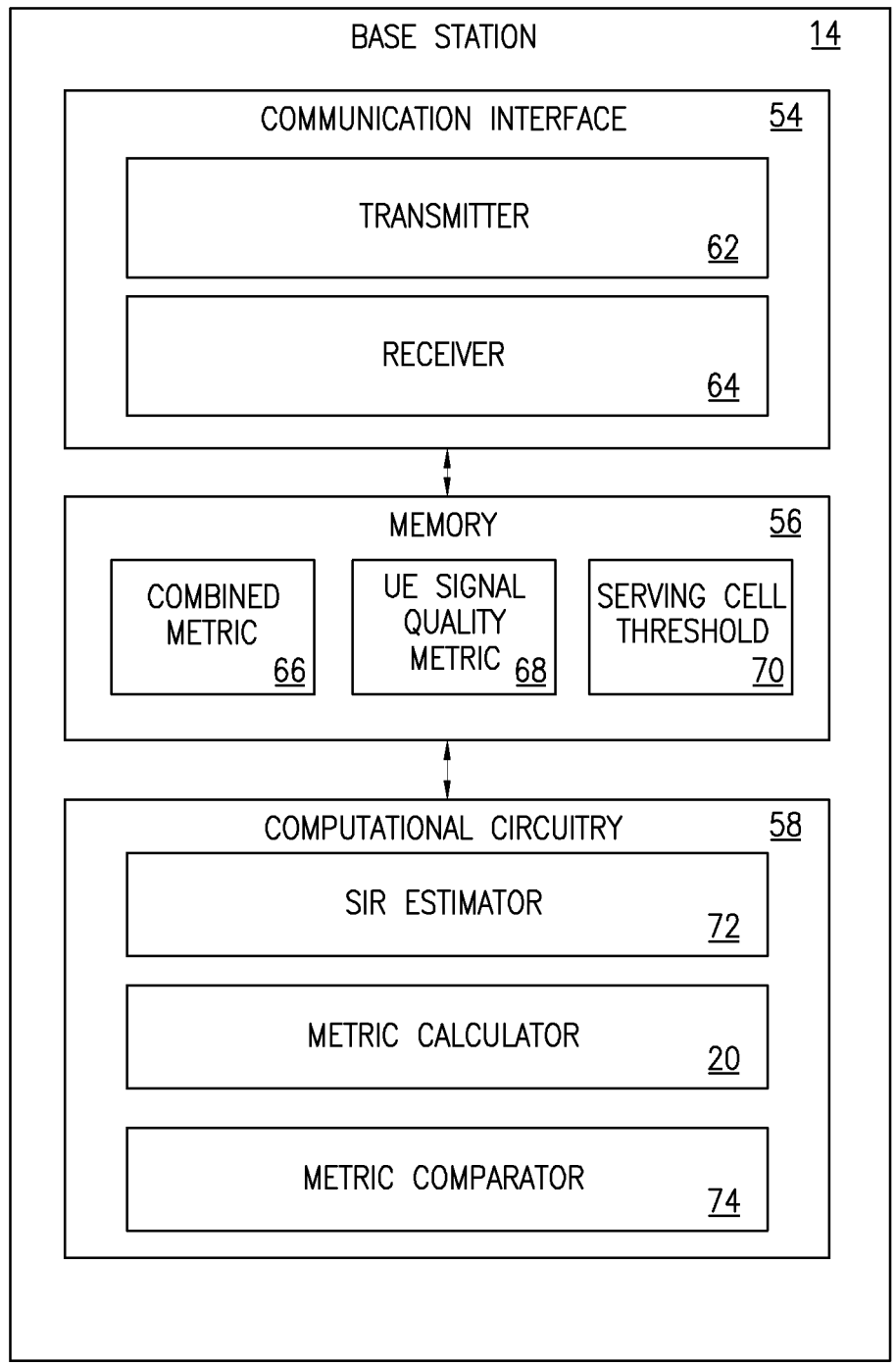
FIG. 9 is a block diagram of one embodiment of a base station configured to determine whether to perform an inter-cell coordination procedure.

FIG. 9 is a block diagram of a base station 14 that is configured to compute the combined metric of equation 15 and compare it to a serving cell threshold to determine whether to perform an inter-cell coordination procedure. The base station 14 has a communication interface 54, a memory 56 and computational circuitry 58. The communication interface 54 has a transmitter 62 that is configured to send a UE threshold to a UE 16 that is used by the UE 15 to compute the UE event metric and determine whether to send a measurement report. The communication interface 54 also has a receiver 64 configured to receive a UE signal quality measurement from the UE 16.

The memory 56 is configured to store a combined metric 66 computed at the base station 14, a UE signal quality measurement report received from the UE 16 from which the UE signal quality metric 58 is calculated and/or stored, and a serving cell threshold 70 to which the combined metric is compared. The memory may also be configured to store a UE threshold to be compared to the UE signal quality metric by the UE 16. The computational circuitry 58 includes a signal to interference ratio (SIR) estimator 72 configured to estimate an SIR experienced by the UE based on received uplink signal quality measurements. The computational circuitry 58 also includes the serving cell metric calculator 20 configured to calculate the serving cell metric and combined metric 66 based on the estimated SIR, the UE signal quality metric and a scaling parameter. A metric comparator 74 compares the combined metric 66 to the serving cell threshold to determine whether to implement an inter-cell coordination procedure. When the combined metric 66 exceeds the serving cell threshold, the base station may make a decision to proceed with an inter-cell coordination procedure.

Figure 10:
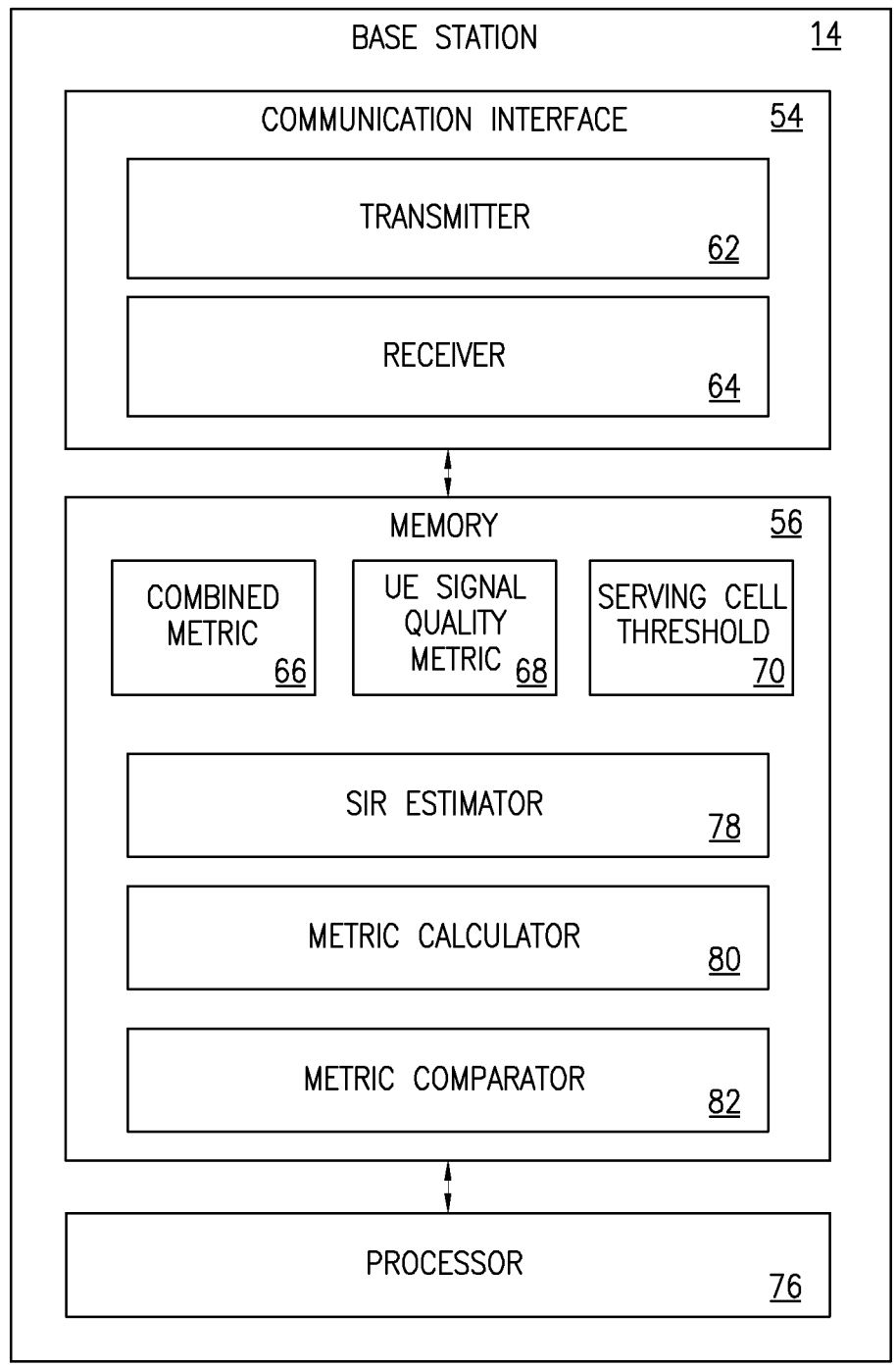
FIG. 10 is a block diagram of another embodiment of a base station configured to determine whether to perform an inter-cell coordination procedure.

FIG. 10 is a block diagram of an embodiment of a base station 14 that uses a processor 76 to execute software instructions of a plurality of software modules stored in the memory 56. The software modules include a SIR estimator module 78 that includes instructions that, when executed by the processor 76, cause the processor to estimate the SIR of the UE based on received uplink signal quality measurements. The metric calculator module 80 has instructions that, when executed by the processor 76, cause the processor to calculate the combined metric 66 based on the estimated SIR, the UE signal quality metric and the scaling parameter, as described above. The metric comparator module 82 has instructions that, when executed by the processor 76, cause the processor to compare the combined metric 66 to the serving cell threshold. When the combined metric 66 exceeds the serving cell threshold, the base station 14 may determine that an inter-cell coordination procedure will likely improve communications with a UE 16 in comparison with an absence of execution of the inter-cell coordination procedure.

Figure 11:
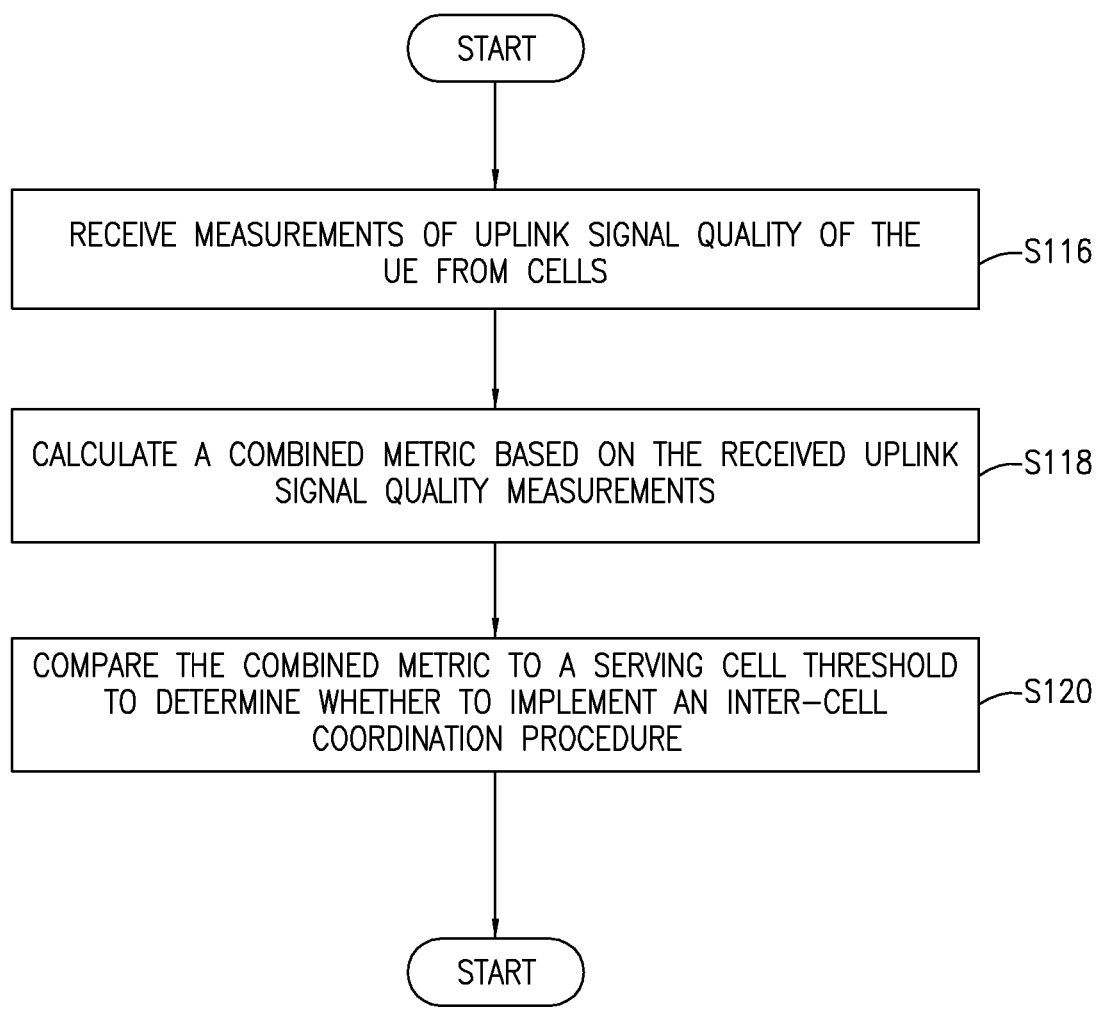
FIG. 11 is a flowchart of an exemplary process for computing a combined metric and comparing the combined metric to a serving cell threshold to determine whether to perform an inter-cell coordination procedure.

FIG. 11 is a flowchart of an exemplary process performed by a base station 14 as described above with reference to FIGS. 9 and 10 for computing a combined metric and comparing the combined metric to a serving cell threshold to determine whether to perform an inter-cell coordination procedure. The serving cell of the base station 14 receives the measurements of uplink signal quality of the UE 16 from neighbor cells. The neighbor cells may be served by the same base station that serves the serving cell (block S116). The base station 14 calculates the combined metric 66 based on the received uplink signal quality measurements and the measurement reports received from the UE (block S118). The calculated combined metric is compared to a serving cell threshold to determine whether to implement an inter-cell coordination procedure (block S120). By not implementing an inter-cell coordination procedure when the comparison indicates that such inter-cell coordination procedure would not be beneficial, resources are conserved.

Figure 12:
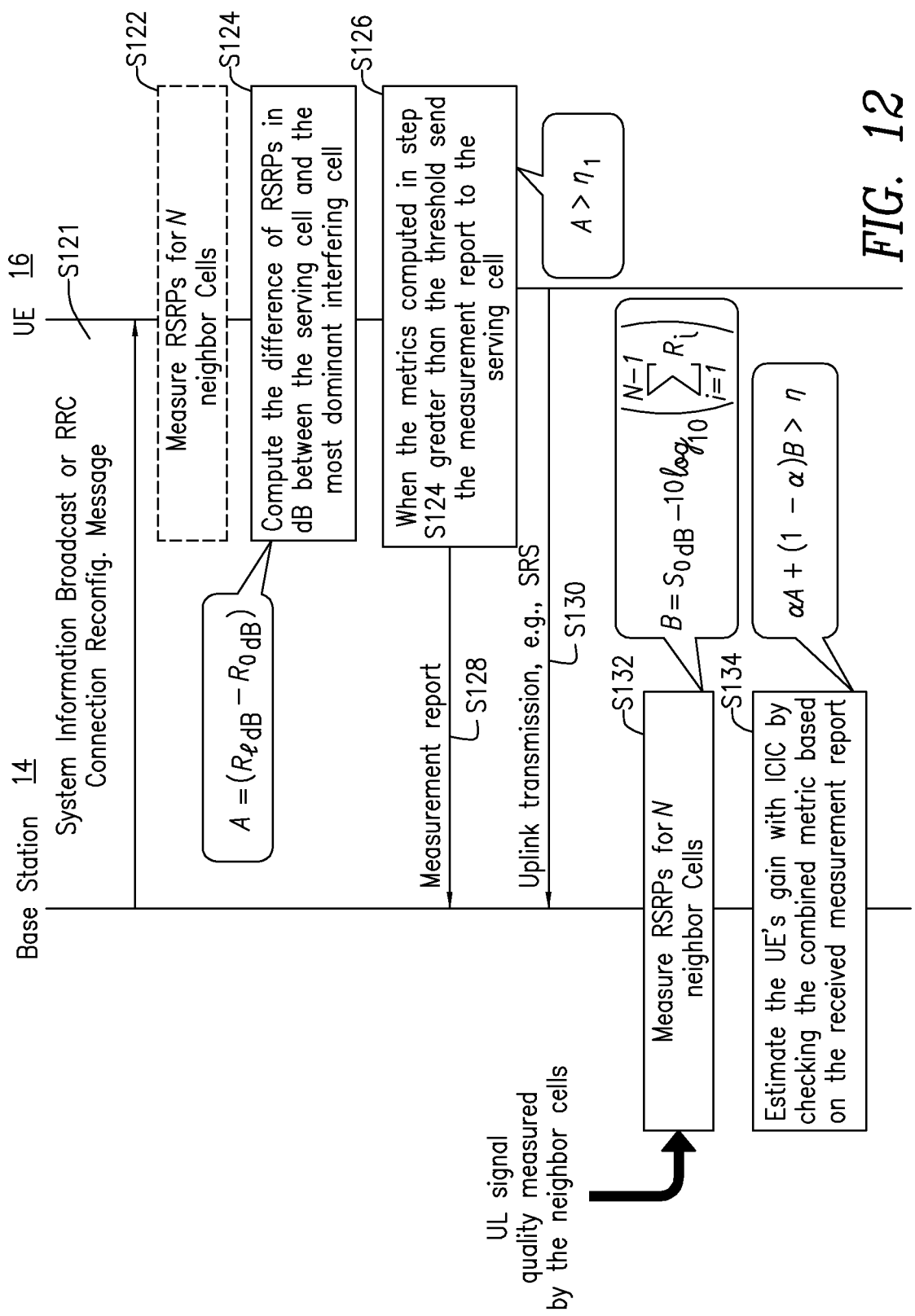
FIG. 12 is a more detailed flow diagram of an exemplary process for computing a combined metric and comparing the combined metric to a serving cell threshold to determine whether to perform an inter-cell coordination procedure.

FIG. 12 is a more detailed flow diagram of an exemplary process for computing a metric and comparing the metric to a threshold to determine whether to perform an inter-cell coordination procedure. The serving cell of the base station 14 sends a broadcast or RRC message to a UE 16 indicating an event to the UE 16 to determine whether to send a measurement report (S121). The signal to the UE 16 may include a UE threshold and a number, N, of neighbor cells whose signal qualities are to be measured. The UE 16 measures signal qualities (such as RSRPs) for the N neighbor cells (S122). The UE 16 computes the difference between the signal qualities of the serving cell and a neighbor cell that is the most dominant interfering cell (S124) as follows:

$$A = (R_{I_{dB}} - R_{0_{dB}})$$

This difference computed in S124 is compared to a UE threshold (S126), which may be received from the base station of the serving cell, to determine whether to send a measurement report:

$$A > \eta_1$$

When the UE threshold is exceeded, a measurement report that includes the received signal qualities with respect to the serving cell and neighbor cells is sent to the serving cell (S128). The UE threshold $\eta_1$ may be set to regulate a ratio of a number of UE measurement reports to a total of UEs in the serving cell and interfering cells. The serving cell and the neighbor cells may also monitor the UL transmissions from the UE 16. For example, the UE 16 transmits its assigned SRS or PUCCH over the assigned resources (S130). The SRS signal quality measured by the neighbor cells and the serving cell are used by the serving cell to estimate a signal to interference ratio (SIR) (S132) as follows:

$$B = S_{0_{dB}} - 10 \log_{10}(\Sigma_{i=1}^{N-1} S_i)$$

The combined metric 66, that includes the difference computed by the UE 16 in S124 and the SIR computed by the base station 14 in S132, is computed and compared to a serving cell threshold (S134) as follows:

$$\alpha A + (1-\alpha) B > \eta$$

where $\alpha$ is the scaling parameter and $\eta$ is a serving cell threshold. The scaling parameter $\alpha$ may be set to achieve one of enablement of coordination gain for UEs experiencing degraded coverage and increased system capacity. If the combined metric 66 exceeds the serving cell threshold, a decision is made to proceed with an inter-cell coordination procedure for the UE 16. Note that in some embodiments, the scaling factor of the first term A may be independent of the scaling factor of the second term B. Note also that the serving cell threshold $\eta$ may be calculated to determine when execution of the inter-cell coordination procedure will likely improve communications with the UE in comparison with an absence of execution of the inter-cell coordination procedure.

The inter-cell coordination procedure just described with reference to FIG. 12 has at least several advantages. First, no non-standard modifications need to be made at the UE 16. Second, the number of measurement reports from UEs 16 is reduced, which conserves bandwidth. Third, inter-cell coordination procedures are only performed for a UE 16 if the performance is likely to achieve coordination gain, which conserves processing resources.

Note also that inter-cell coordination procedure just described can be extended to the cells of more than one base station 14 by communicating the uplink signal quality measured by a cell of one base station 14b to the base station 14a of the serving cell C1 via an X2 interface or proprietary interface between the base stations 14.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A base station serving a user equipment, UE, via a serving cell and a plurality of neighboring cells, the base station comprising:
   a communication interface configured to receive a UE signal quality measurement report;
   a memory configured to store:
      a combined metric computed at the base station;
      a UE signal quality measurement report from the UE and transmitted to the base station; and
      a serving cell threshold; and
   computational circuitry in operative communication with the memory and the communication interface, the computational circuitry configured to:
      calculate a signal to interference ratio, SIR, experienced by the UE based on received uplink signal quality measurements at the serving cell and the neighboring cells;
      calculate a UE signal quality metric based on the UE signal quality measurement report;
      calculate the combined metric based on the estimated SIR, the UE signal quality metric and a scaling parameter; and
      compare the combined metric to the serving cell threshold to determine whether to implement an inter-cell coordination procedure.

2. The base station of claim 1, wherein the memory is further configured to store a UE threshold to be sent to the UE to trigger the UE signal quality measurement report.

3. The base station of claim 2, wherein UE signal quality measurement report contains received signal qualities of the serving cell and neighboring cells as measured at the UE.

4. The base station of claim 1, wherein the combined metric is calculated by determining an algebraic sum of the scaling parameter times the UE signal quality metric and one minus the scaling parameter times the estimated signal to interference ratio.

5. The method of claim 4, wherein the UE signal quality metric is calculated as a received signal quality of a dominant neighboring cell in a logarithmic scale minus a received signal quality of the serving cell in logarithmic scale.

6. The base station of claim 1, wherein the combined metric calculated by the computational circuitry is given by:

$$\beta_{dB} = \alpha(R_{I_{dB}} - R_{0_{dB}}) + (1-\alpha)\left(S_{0_{dB}} - 10\log_{10}\left(\sum_{i=1}^{N-1} S_i\right)\right)$$

where $\alpha$ is the scaling parameter, $R_{Ids}$ is the signal quality of a dominant interfering cell measured at the UE, $R_{odB}$ is the signal quality of a serving base station measured at the UE, $S_{0dB}$ is the signal quality measured at the serving base station of a UE transmission, and $S_i$ is the signal quality measured at the ith interfering cell of the UE transmission.

7. The base station of claim 1, wherein the measurement report containing a received signal quality of the serving and neighboring cells measured at the UE is sent when a measure of a signal quality from a dominant interfering cell compared to a signal quality of the serving cell is greater than a UE threshold.

8. The base station of claim 7, wherein the UE threshold is specified by the serving cell and is calculated to regulate a frequency of measurement reports from the UE.

9. The base station of claim 1, wherein the serving cell threshold is calculated to determine when execution of an inter-cell coordination procedure will improve communications with the UE in comparison with an absence of execution of the inter-cell coordination procedure.

10. A base station, comprising:
   a communication interface configured to receive a user equipment, UE, signal quality measurement report;
   a processor configured to execute software instructions;
   a memory in communication with the processor, the memory configured to store:
      a combined metric;
      the UE signal quality measurement report received from the UE by the communication interface;
      a serving cell threshold; and
      a plurality of software modules, including:
         a signal to interference, SIR, estimator module having instructions that, when executed by the processor, cause the processor to estimate a signal to interference ratio, SIR, experienced by a user equipment, UE, based on received uplink signal strength measurements;
         a metric calculator module having instructions that, when executed by the processor, cause the processor to calculate the combined metric based on the estimated SIR, a UE signal quality metric determined from the UE signal quality measurement report and a scaling parameter; and
         a metric comparator module having instructions that, when executed by the processor, cause the processor to compare the combined metric to the serving cell threshold to determine whether to implement an inter-cell coordination procedure.

11. The base station of claim 10, wherein the processor is further instructed by the instructions of the metric calculator module to calculate the combined metric as the algebraic sum of the scaling parameter times the UE signal quality metric and one minus the scaling parameter times the estimated signal to interference ratio.

12. The method of claim 11, wherein the UE signal quality metric is calculated as a received signal quality of a dominant neighboring cell in a logarithmic scale minus a received signal quality of the serving cell in logarithmic scale.

13. The base station of claim 10, wherein the processor is further instructed by the instructions of the metric comparator module to determine, based on the combined metric, whether to execute the inter-cell coordination procedure.

14. The base station of claim 10, wherein the memory is further configured to store a UE threshold to be sent to the UE for triggering a measurement report from the UE).

* * * * *